June 1, 1965 F. C. NIEHAUS 3,186,323
VISUAL DISPLAY INSURANCE KIT
Filed Sept. 7, 1962 3 Sheets-Sheet 1
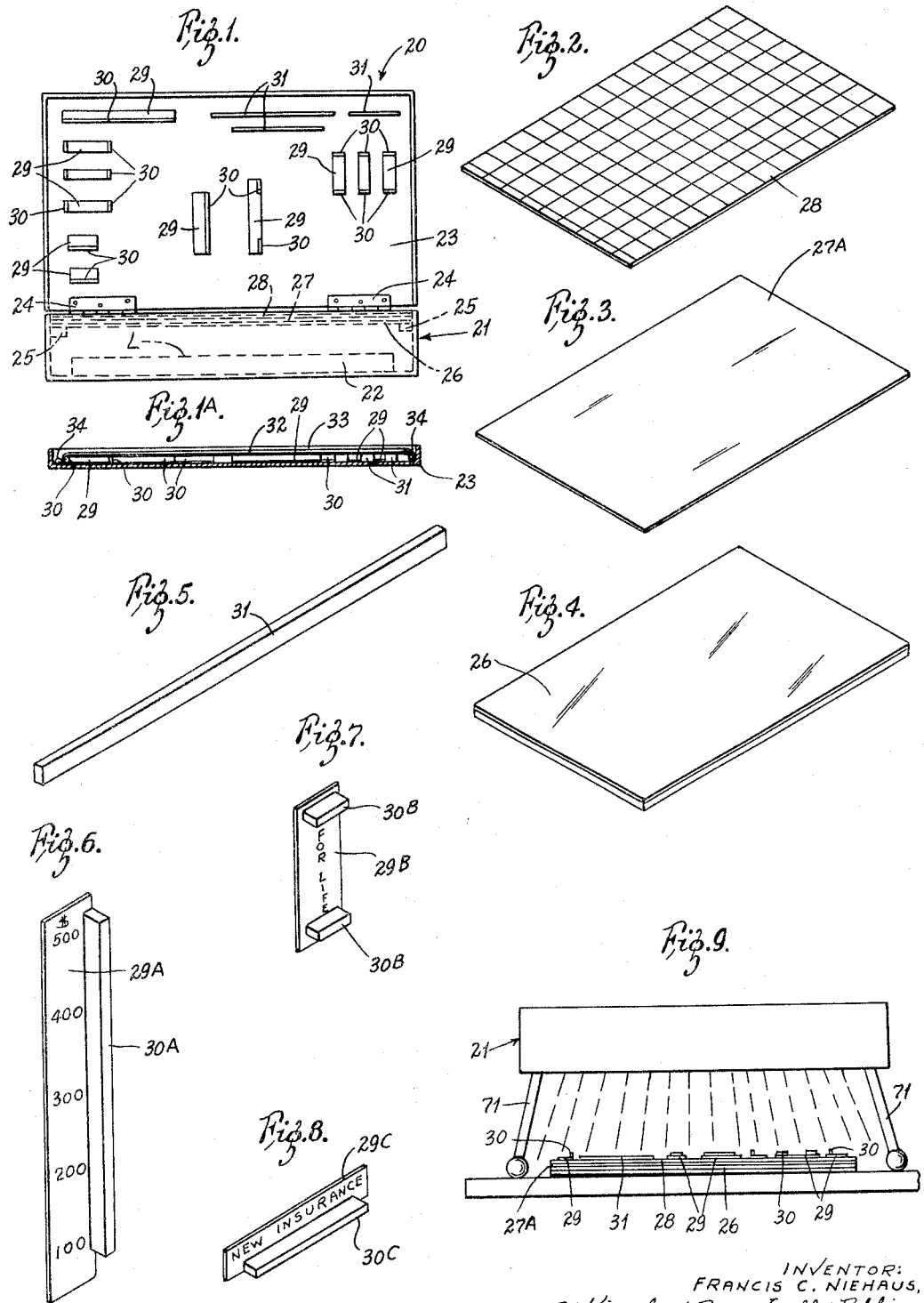
INVENTOR:
FRANCIS C. NIEHAUS,
BY Kingsland, Rogers, Ezell & Robbins
ATTORNEYS

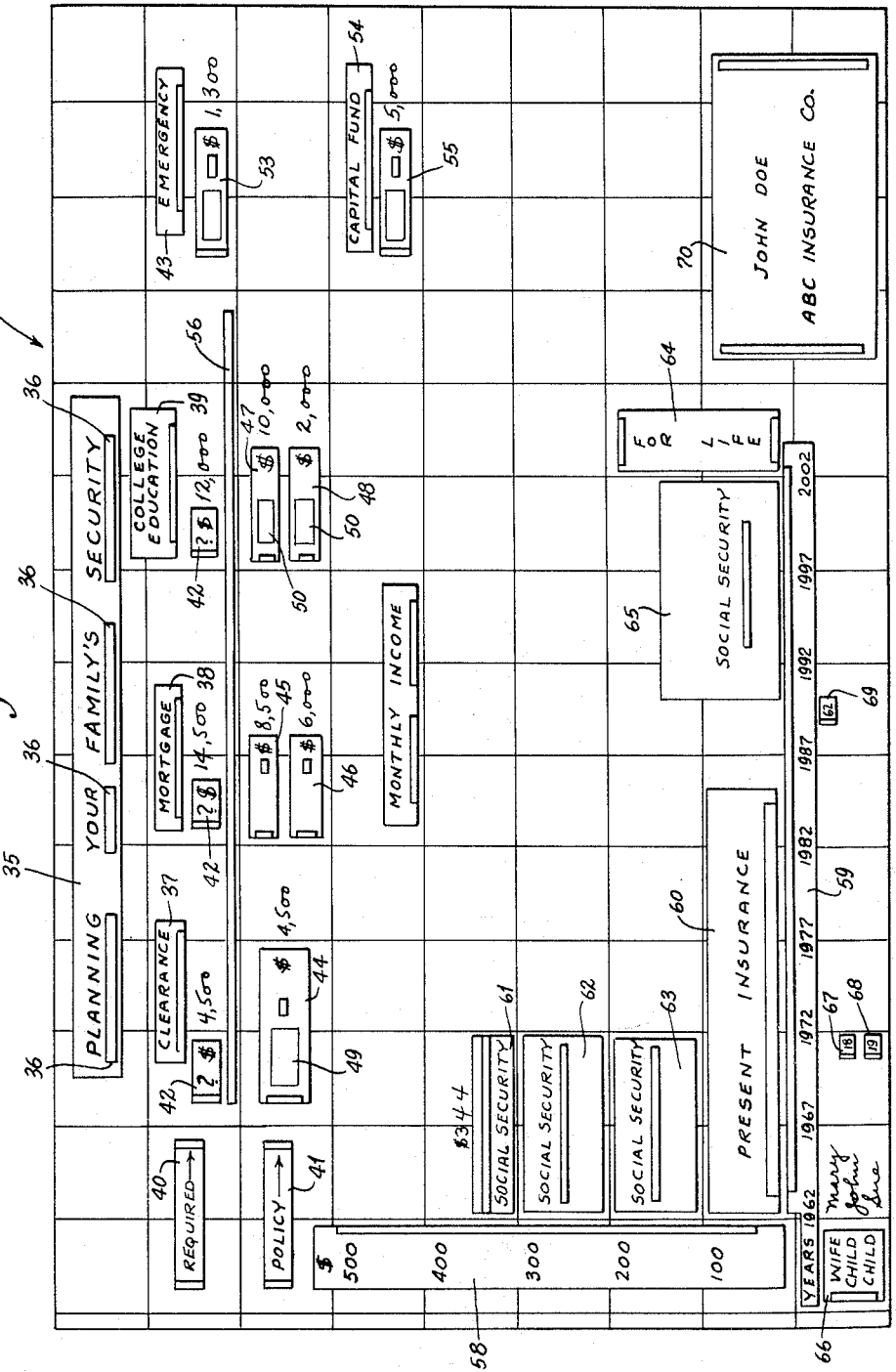

June 1, 1965  F. C. NIEHAUS  3,186,323
VISUAL DISPLAY INSURANCE KIT
Filed Sept. 7, 1962  3 Sheets-Sheet 3
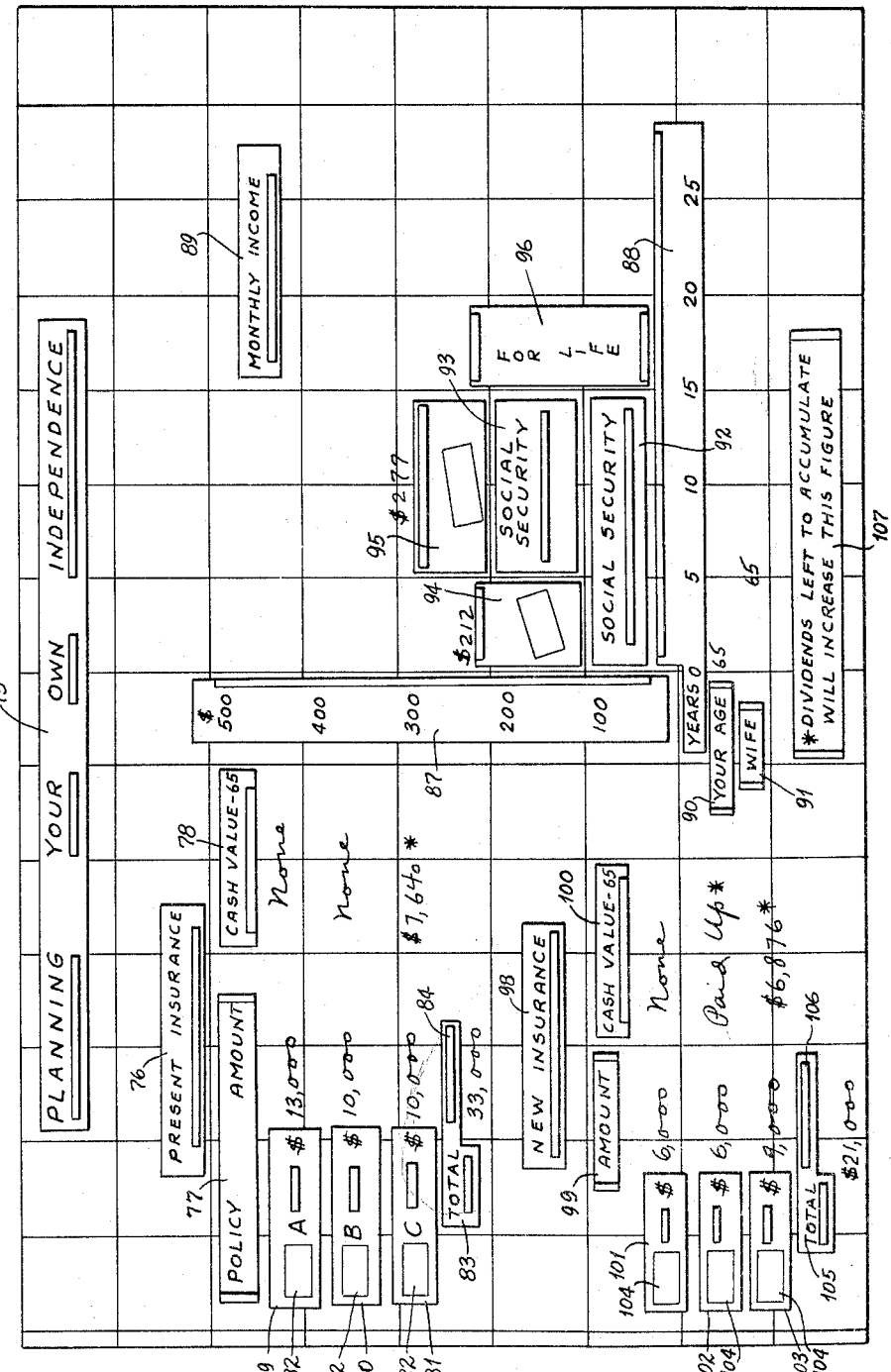
INVENTOR:
FRANCIS C. NIEHAUS,
BY Kingsland, Rogers, Ezell & Robbins
ATTORNEYS

United States Patent Office

3,186,323
Patented June 1, 1965

3,186,323
VISUAL DISPLAY INSURANCE KIT
Francis C. Niehaus, St. Louis, Mo., assignor to Magic Decorator Company, St. Louis, Mo., a corporation of Missouri
Filed Sept. 7, 1962, Ser. No. 222,027
2 Claims. (Cl. 95—85)

This invention relates to a sales kit, particularly a kit for providing a graphic aid in the sale of insurance. The invention generally comprises a portable carrying case housing all of the parts of the kit. These parts include a sheet of metal or sheet that is otherwise treated to attract magnets and a number of thin plastic plates each having one or more magnets glued to it. Different plates have different writing on them indicating different aspects associated with the explanation and sale of insurance. These various plates, when placed on the metal sheet, will remain in place during the course of a sale.

The portable case also has some exposure lamps in it, some printing paper and some developer solution. When the printing paper, the metal sheet and a transparent sheet are stacked in proper relationship and after the various plates have been positioned to display an insurance program, the exposure lamps can be energized to expose the printing paper. The printing paper when developed presents a permanent record of the insurance program.

The principal object of this invention is to provide a sales kit that has a sheet or board attractive to magnets and a number of different plastic plates having different indications written on them and small magnets glued to them so that the plates can be positioned on the sheet or board to represent an insurance program.

Another important object of the invention is to provide a graphic display kit that is very convenient for insurance personnel to use in demonstrating the insurance needs of prospective customers and the best solution or solutions for those needs, while eliminating the sometimes obnoxious moderate or high pressure persuasion that often accompanies the sale of insurance or other commodity.

Yet another object of the invention is to provide a compact kit that is sufficiently portable and light in weight to be carried around for use in the sale of insurance or other service or commodity and that is extremely versatile in supplying various means for graphically displaying and photographing the elements involved in the sales program.

Yet another object of the invention is to provide a sales kit for graphically displaying a sales program in such a way as to maintain the interest of a potential customer and even to encourage the customer to participate in setting forth details of the graphic display.

Yet another object of the invention is to provide a portable kit having a magnet attractive plate and a plurality of magnets of various sizes and shapes to allow an insurance sales person all of the variety needed to quickly display any requested insurance program.

Other objects and advantages will be apparent to those skilled in the art.

In the drawings:

FIGURE 1 is a front elevation view of the kit showing the case and the lid of the case pivoted upwardly;

FIGURE 1-A is a view in section from side to side through the lid of the case;

FIGURE 2 is an isometric view of the lined transparent plastic sheet upon which the magnets are placed;

FIGURE 3 is an isometric view of a sheet of printing paper;

FIGURE 4 is an isometric view of the metal or otherwise magnetically attractive sheet;

FIGURE 5 is an isometric view of a typical flexible magnetized strip of plastic or rubber or the like;

FIGURE 6 is an isometric view demonstrating one kind of plate and magnet used for the display;

FIGURE 7 is an isometric view of another kind of transparent plastic plate used for the display;

FIGURE 8 is an isometric view of still another transparent plastic plate used for the display;

FIGURE 9 is a front elevation view that is somewhat schematic to illustrate how the case is positioned to direct light upon a display to expose the printing paper; and FIGURES 10 and 11 are plan views of typical displays or of photographs of such displays, the plan views of the displays and photographs being quite similar.

Referring now to the drawing, and particularly to FIGURE 1, the kit 20 comprises a case 21. The body 22 of the case is hollow and houses two or three exposure lamps L which can be lit by an external cord (not shown).

There is a lid 23 pivotally fastened to an upper edge of the body 22 by a pair of hinges 24 of the kind that allow removal of the lid 23.

The case 21 has a pair of ledges 25 fastened to opposite ends for supporting a metal or otherwise magnetic attractive sheet 26, a package of printing paper 27, and a lined transparent plastic sheet 28. The case 21 is preferably made of metal, and the lid 23 should definitely be made of metal or coated with metal or other magnetically attractive substance.

As shown in FIGURES 1 and 2, there are a plurality of display plates 29 held against the lid 23 by small magnets 30. There are also some flexible magnetic bars 31 supported by the lid 23. Some examples of these objects 28, 30 and 31 are illustrated in FIGURES 5 through 8. FIGURE 5 illustrates a typical bar 31 made of magnetized flexible plastic or rubber. FIGURE 6 is an example of a transparent plastic plate 29A having a flexible bar magnet 30A glued to it. FIGURE 7 is an example of a smaller clear plastic plate 29B having a pair of flexible plastic magnets 30B glued to it. FIGURE 8 is an example of still another flexible plastic plate 29C having a flexible bar magnet 30C glued to it. Various sizes and shapes of these plastic plates 29, as exemplified in FIGURES 6, 7 and 8 are supported by the lid 23 to provide flexibility in setting out an insurance program as exemplified by FIGURES 10 and 11.

In storage, particularly during shipping or rough handling, when the plastic plates 29 are in place on the lid 23, they may be covered by a cardboard or plastic sheet 32 held in place by two or more elastic cords 33 releasably fastened by hooks 34 to the lid 23. Otherwise, during normal transport by an insurance agent, the magnets will stay in place on the lid, particularly if the inner surface of the lid is lined with a sheet of tin, or is otherwise of a material attractive to magnets.

FIGURES 10 and 11 illustrate typical visual displays of insurance programs. These layouts are done on the lined transparent sheet 28 which has beneath it a sheet of printing paper 27A and the magnetically attractive sheet 26. In describing FIGURES 10 and 11, the numbers used for the plates 29 and their magnets 30 will not be followed, it being understood that these plates 29 and their magnets 30 are examples of the various plates and magnets shown in FIGURES 10 and 11.

In FIGURE 10, there is a title plate 35 held in place by a plurality of magnets 36. This title plate, headed "Planning Your Family's Security," indicates that the display in FIGURE 10 illustrates the insurance needs of a prospective client to protect his family in the event of his death.

There are three plates 37, 38 and 39 bearing the notations, "Clearance," "Mortgage" and "College Education." These are cash needs that must be considered in an insurance program and are set up in a horizontal row to provide three vertical columns. To the left of these columns there is a plate 40 with the notation "Required," and below this there is a plate 41 with the notation "Policy."

The "Required" plate 40 lets the prospective client participate in determining what his cash needs are for the three headings, "Clearance," "Mortgage" and "College Education." Opposite this "Required" plate 40 and below each plate 37, 38 and 39 there is a "? $" plate 42, and the drawing indicates that the prospective customer has decided he needs $4,500.00 to clear existing indebtedness, $14,500.00 to pay off his mortgage, and $12,000.00 for education. Still further to the right, there is another plate 43 with the notation, "Emergency" under which the prospective client can write an amount of dollars he feels he will need to provide for the unexpected, not otherwise categorized.

Opposite the "Policy" plate 41 and the "Clearance," "Mortgage" and "College Education" columns, there are plates 44, 45, 46, 47 and 48, each having a drawing 49 of an insurance policy or a drawing 50 of a check on it, and each having a dollar sign drawn on it. With the client's concurrence, money amounts are written opposite these plates 44 through 48 to indicate where insurance polices would be used to satisfy the cash needs opposite the "Required" plate 40. Thus, these plates 44 through 48 show how the insurance would be distributed at the prospect's death.

There is also a policy plate 53 beneath the emergency plate 4300 to satisfy that need.

There is a plate 54 bearing the notation "Capital Fund." This plate is not so much in the nature of a need as it is in the nature of a desire on the part of the insured to provide a cash amount upon which his family can build its own capital after his death. The insured may write an amount beneath this plate 54 that he would like to have covered, and there may be an "Insurance" plate 55 placed opposite this amount to indicate that there should be a policy to cover it.

To keep the needs opposite the "Required" plate 40 separated from the solutions opposite the "Policy" plate 41, there is a magnetic bar 56. Such bars may be used wherever separations of displays seem indicated.

An income graph can be made with a pair of plates 58 and 59. The plate 58 has graduations of dollar amounts written on it, and the plate 59 has graduations of years written on it. The purpose of this graph is to indicate the amount of income and the duration of that income that the family would receive from present insurance, Social Security, and new insurance. In the illustration, a plate 60 bearing the notation "Present Insurance" indicates that the present insurance will pay an income of slightly less than $100.00 until 1985. Three plates 61, 62 and 63 bearing the notation "Social Security" indicate that Social Security would be paid until almost 1972, giving a total income of $344.00 up to 1972 and a little less than $100.00 thereafter until 1985. At the right side of the graph there is a plate 64 bearing the notation "For Life," indicating that any plates abutting the plate 64 indicate income paid on a lifetime basis. Such a plate 65 bearing the notation "Social Security" is an example of a plate indicating the payment of $150.00 for life.

A plate 66 bearing the notation "Monthly Income" is used to entitle the graph and indicate that the designated income is payable monthly.

Below the graph, there is a plate 66 bearing the notation "Wife, Child, Child" and having a place to write in the names of these people. There are small plates 67, 68 and 69 to indicate the ages of the wife and children. This information is important in determining when the Social Security benefits would be paid.

Finally, on the display of FIGURE 10, there is a plate 70 bearing the name of the insurance agent and his insurance company. When the display is photographed, these names are on the print for constant reference to the names of the agent laying out the program.

To make a print of the display illustrated in FIGURE 10, it is merely left intact and placed on a horizontal surface. Then the case 21 with the lid 23 removed, is inverted and four legs 71 are extended as illustrated in FIGURE 9. The lamps are energized to expose the printing paper 27A. Then the printing paper is removed and coated with a suitable developing compound that produces a print in a short period of time. The technical details of the development of the paper 27A are not of themselves a part of this invention.

The display of FIGURE 11 has a plate 75 bearing the heading "Planning Your Own Independence." This plate 75 indicates that the display of FIGURE 11 is intended to set forth an insurance policy to provide for the needs of a prospective customer after his retirement or disability.

The display starts with a plate 76 bearing the notation "Present Insurance" beneath which are two plates 77 and 78 to indicate policies and cash value of the policies. Below the policy plate 77 there may be positioned a plurality of plates 79, 80, 81, each bearing the symbol of an insurance policy 82, the notations "Policy A," "Policy B" or "Policy C," and a dollar sign. Opposite these plates 79, 80 and 81, the prospective insured can write in the policy amounts. Below these amounts, there is a plate 83 bearing the notation "Total" and having a horizontal line 84 on it. This lets the total amount of the policies be written below the line 84. Beneath the "Cash Value" plate 78 amounts representing the cash value of the policies are written in.

There is a graph comprising a pair of plates 87 and 88. The plate 87 represents progressively increasing dollar amounts and the plate 88 represents progressively increasing numbers of years. A plate 89 indicates that the graph represents monthly income. Beneath the graph there is a plate 90 indicating the age of the prospective insured and a plate 91 indicating the age of his wife, these ages being written in opposite the plates 90 and 91 beneath the number of years following the present that such ages will occur. The graph has been used in about the same way as the graph already described in connection with FIGURE 10. There are various plates 92 and 93 representing the amount and duration that Social Security would be paid, a plate 94 representing the amount and duration that money would be paid on present insurance, and a plate 95 representing the amount and duration that money would be paid under new insurance policies. There is also a plate 96 bearing the notation "For Life" and indicating that any plates that abutted indicate amounts that would be paid for life. This graph is useful in allowing the prospective insured to determine how much monthly income he needs for his own independence.

There is a plate 98 headed "New Insurance" with two plates 99 and 100 beneath it bearing the notations "Amount" and "Cash Value." To the left of the plates 99 and 100 there are three plates 101, 102 and 103, each having an indication 104 of a policy and a dollar sign. Opposite these plates 101, 102 and 103, dollar amounts can be written in representing the amounts of policies needed to satisfy the requirements of the prospective insured, and beneath the plate 100 the cash value of these proposed policies can be written in. There is a plate 105 bearing the notation "Total" and having a line 106 on it. The sum of the policy amounts can be written beneath the plate 105.

Finally, there may be a plate 107 having an asterisk to indicate that dividends would increase certain figures previously written and also having asterisks beside them. Since dividends paid are indeterminate, the plate 107 is a convenient way to account for them on a graph.

It will be understood that as shown, the plates described in connection with FIGURES 10 and 11 have one or more magnets that hold them in place. It will also be understood that these FIGURES 10 and 11 are only examples of insurance programs that can be quite conveniently laid out by a skilled insurance agent with a resulting great increase in the understanding of the proposed insured as to exactly what an insurance program can do for him.

Various changes and modifications may be made within the process of this invention as will be readily apparent to those skilled in the art. Such changes and modifications are within the scope and teaching of this invention as defined by the claims appended thereto.

What is claimed is:

1. A graphic display kit for aiding the sale of insurance and the like comprising a case, a sheet removably supported within the case and having in its construction a material to which magnets are attracted, a sheet of printing paper and a transparent sheet, and a plurality of small transparent plates each having one or more magnets glued to it, the small transparent plates being in different sizes and shapes and bearing different notations for selective use in laying out an insurance program, each small transparent plate being rectangular with a width representing a predetermined value on a first scale and a height representing a predetermined value on a second scale, the magnets glued to the small plates having sufficient magnetic strength to hold the small plates against the transparent sheet when the sheet of printing paper is placed upon the magnetically attractive sheet and the transparent sheet is placed upon the sheet of printing paper, the various dimensions and different notations on the small transparent plates enabling their selective placement upon the transparent sheet to graphically display selective values on the first and second scales, a cover for the case, the cover being removable and the case having lamps in it for exposing the printing paper when the lamps are energized and the case is placed over a display.

2. The combination of claim 1 wherein at least the inside surface of the cover is a ferrous composition to which magnets are attractive so that the small plates with the magnets glued to them can be stored on the cover, a sheet for covering the objects stored on the cover, and means for locking the last mentioned sheet in place.

References Cited by the Examiner
UNITED STATES PATENTS

| | | | |
|---|---|---|---|
| 1,879,002 | 9/32 | Alles | 40—142 |
| 2,638,040 | 5/53 | Murphy | 95—85 X |
| 2,346,582 | 4/44 | Insler. | |
| 2,752,245 | 6/56 | Hough | 95—85 X |
| 2,816,380 | 12/57 | Sindell | 40—142 |

NORTON ANSHER, *Primary Examiner.*

J. SCHNALL, *Examiner.*

UNITED STATES PATENT OFFICE
CERTIFICATE OF CORRECTION

Patent No. 3,186,323                                June 1, 1965

Francis C. Niehaus

It is hereby certified that error appears in the above numbered patent requiring correction and that the said Letters Patent should read as corrected below.

In the grant, lines 2 and 3, strike out "assignor to Magic Decorator Company, of St. Louis, Missouri, a corporation of Missouri,"; line 12, for "Magic Decorator Company, its successors" read -- Francis C. Niehaus, his heirs --; in the heading to the printed specification, lines 3 to 5, for "Francis C. Niehaus, St. Louis, Mo., assignor to Magic Decorator Company, St. Louis, Mo., a corporation of Missouri" read -- Francis C. Niehaus, 123 Calverton Rd., St. Louis, Mo. --.

Signed and sealed this 19th day of October 1965.

SEAL)
Attest:

ERNEST W. SWIDER                                  EDWARD J. BRENNER
Attesting Officer                                     Commissioner of Patents